US006988133B1

(12) United States Patent
Zavalkovsky et al.

(10) Patent No.: US 6,988,133 B1
(45) Date of Patent: Jan. 17, 2006

(54) METHOD AND APPARATUS FOR COMMUNICATING NETWORK QUALITY OF SERVICE POLICY INFORMATION TO A PLURALITY OF POLICY ENFORCEMENT POINTS

(75) Inventors: Arthur Zavalkovsky, Herzeliya Pituach (IL); Nitsan Elfassy, Herzeliya Pituach (IL)

(73) Assignee: Cisco Technology, Inc., San Jose, CA (US)

( * ) Notice: Subject to any disclaimer, the term of this patent is extended or adjusted under 35 U.S.C. 154(b) by 809 days.

(21) Appl. No.: 09/703,504

(22) Filed: Oct. 31, 2000

(51) Int. Cl.
*G06F 15/173* (2006.01)
*G06G 15/177* (2006.01)

(52) U.S. Cl. ...................... 709/223; 709/243; 709/220; 709/224

(58) Field of Classification Search ................ 709/223, 709/221, 204, 219, 232; 370/230; 455/406, 455/422
See application file for complete search history.

(56) References Cited

U.S. PATENT DOCUMENTS

| | | | | |
|---|---|---|---|---|
| 5,359,593 | A | 10/1994 | Derby et al. | |
| 5,594,792 | A | 1/1997 | Chouraki et al. | |
| 5,928,331 | A | 7/1999 | Bushmitch | |
| 5,968,176 | A | 10/1999 | Nessett et al. | |
| 5,970,064 | A | 10/1999 | Clark et al. | 370/351 |
| 6,009,081 | A | 12/1999 | Wheeler et al. | |
| 6,021,263 | A | 2/2000 | Kujoory et al. | |
| 6,021,439 | A | 2/2000 | Turek et al. | 709/224 |
| 6,028,842 | A | 2/2000 | Chapman et al. | 370/235 |
| 6,046,980 | A | 4/2000 | Packer | |
| 6,047,322 | A | 4/2000 | Vaid et al. | |
| 6,061,725 | A | 5/2000 | Schwaller et al. | |
| 6,104,700 | A | 8/2000 | Haddock et al. | 370/235 |

(Continued)

OTHER PUBLICATIONS

D. Durham et al., "The COPS (Common Open Policy Service) Protocol," RFC 2748, Internet Engineering Task Force (IETF), Jan. 2000.

(Continued)

*Primary Examiner*—Rupal Dharia
*Assistant Examiner*—Djenane Bayard
(74) *Attorney, Agent, or Firm*—Hickman Palermo Truong & Becker, LLP

(57) ABSTRACT

A method is disclosed for communicating network quality of service policy information to a plurality of policy enforcement points. Active QoS configuration information is created and stored at a policy enforcement point, such as a router in a network. New configuration information is received and stored as an inactive configuration of the policy enforcement point. The policy enforcement point determines whether the inactive configuration information is properly functional in combination with the active QoS configuration information. The new configuration information is made active in place of the active QoS configuration information only in response to receiving an activation message. An inactive configuration may be signaled by a COPS protocol decision message from the policy decision point that identifies the configuration information as an inactive configuration by a specified flag bit in a message type value in a Context object that forms part of the decision message. Using the method, network quality of service policy information may be communicated to a plurality of policy enforcement points, with assurance that all receiving policy enforcement points can successfully deploy the configuration information. As a result, new QoS policy configuration information can be deployed to an entire network or to a large plurality of devices with assurance that all such information is received and deployed without adverse effects on the network or enforcement of policy information.

18 Claims, 8 Drawing Sheets

U.S. PATENT DOCUMENTS

| | | | | |
|---|---|---|---|---|
| 6,118,760 | A | 9/2000 | Zaumen et al. | 370/229 |
| 6,154,776 | A | 11/2000 | Martin | 709/226 |
| 6,167,445 | A * | 12/2000 | Gai et al. | 709/223 |
| 6,169,748 | B1 | 1/2001 | Barbas et al. | 370/468 |
| 6,170,009 | B1 * | 1/2001 | Mandal et al. | 709/223 |
| 6,212,184 | B1 | 4/2001 | Venkatachary et al. | |
| 6,286,052 | B1 | 9/2001 | McCloghrie et al. | |
| 6,301,253 | B1 | 10/2001 | Ichikawa | 370/395 |
| 6,301,613 | B1 * | 10/2001 | Ahlstrom et al. | 709/223 |
| 6,324,184 | B1 | 11/2001 | Hou et al. | |
| 6,327,618 | B1 | 12/2001 | Ahlstrom et al. | 709/223 |
| 6,363,429 | B1 | 3/2002 | Ketcham | 709/235 |
| 6,393,473 | B1 | 5/2002 | Chu | |
| 6,401,240 | B1 * | 6/2002 | Summers | 717/130 |
| 6,424,659 | B2 | 7/2002 | Viswanadham et al. | |
| 6,430,154 | B1 | 8/2002 | Hunt et al. | |
| 6,442,151 | B1 | 8/2002 | H'mimy et al. | |
| 6,463,470 | B1 | 10/2002 | Mohaban et al. | |
| 6,466,984 | B1 | 10/2002 | Naveh et al. | |
| 6,473,793 | B1 | 10/2002 | Dillion et al. | |
| 6,483,805 | B1 | 11/2002 | Davies et al. | |
| 6,484,261 | B1 | 11/2002 | Wiegel | |
| 6,539,425 | B1 | 3/2003 | Stevens et al. | |
| 6,570,875 | B1 | 5/2003 | Hegde | |
| 6,577,644 | B1 | 6/2003 | Chuah et al. | |
| 6,594,268 | B1 | 7/2003 | Aukia et al. | |
| 6,601,082 | B1 * | 7/2003 | Durham et al. | 718/100 |
| 6,611,864 | B2 * | 8/2003 | Putzolu et al. | 709/223 |
| 6,621,793 | B2 * | 9/2003 | Widegren et al. | 370/230.1 |
| 6,622,170 | B1 * | 9/2003 | Harrison et al. | 709/221 |
| 6,651,191 | B1 * | 11/2003 | Vacante et al. | 714/47 |
| 6,671,724 | B1 | 12/2003 | Pandya et al. | |
| 6,684,244 | B1 | 1/2004 | Goldman et al. | |

OTHER PUBLICATIONS

S. Herzog et al., "COPS Usage for RSVP," RFC 2749, Internet Engineering Task Force (IETF), Jan. 2000.

S. Blake, et al., "An Architecture for Differentiated Services," Dec. 1998, pp. 1-36.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.

* cited by examiner

METHOD AND APPARATUS FOR COMMUNICATING NETWORK QUALITY OF SERVICE POLICY INFORMATION TO A PLURALITY OF POLICY ENFORCEMENT POINTS

FIELD OF INVENTION

The present invention generally relates to creating and enforcing network quality of service policy information in a network. The invention relates more specifically to a method and apparatus for communicating network quality of service policy information to a plurality of policy enforcement points.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network (" MAN") or Intranet. These internetworks may be coupled through one or more gateways to the global, packet-switched internetwork generally known as the Internet or World Wide Web (WWW).

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP, which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message that is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2, which in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. Conventionally, IP data packets include a corresponding header that contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Additionally, the intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106.

According to the 802.1Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_ service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet. Thus, ToS field 122 facilitates applying various quality of service treatments to packets.

The Common Open Policy Service (COPS) protocol provides one approach for distributing QoS information to a network device. The COPS protocol is defined in RFC 2748, "The COPS (Common Open Policy Service) Protocol," by J. Boyle et al., January 2000. The use of COPS for resource reservation is described in RFC 2749, "COPS usage for RSVP," J. Boyle, et al., January 2000. The use of COPS for provisioning is described in the IETF Internet-draft document "draft-ietf-rap-cops-pr-04.txt." Readers of this patent are assumed to have read the foregoing documents and to understand how to implement their subject matter in a working system.

COPS is a query and response protocol that can be used to exchange policy information between a policy server (Policy Decision Point or PDP) and its clients (Policy Enforcement Points or PEPs). One example of a policy client is a router compatible with Resource Reservation Protocol (RSVP) that must exercise policy-based admission control over RSVP usage. PEPs may be routers, switches, gateways, etc., or any other device that is configured, using one or more software elements or hardware elements, to carry out policy enforcement.

One drawback of the COPS protocol is that it does not provide a mechanism to enable a PDP to download configuration information to a plurality of PEPs with assurance that all the PEPs receive all the configuration information. Thus, there is no way to ensure that specified quality of service information is successfully deployed to an entire network or to a plurality of policy enforcement points. In particular, simultaneous download of configuration information to multiple devices, wherein the configuration information may differ from device to device, is not guaranteed. In one approach, a deployment is sent to and pre-tested by a plurality of target devices. Although this approach increases the likelihood of successfully installing the configuration on all the target devices, there is no guarantee of successful deployment to the entire target device group. Thus, even if such pre-testing is carried out, there is a chance that subsequent actual deployment of the QoS information will not work. For example, if network conditions change between the time of pre-testing and actual deployment, one or more devices may change one or more internal values that resulted in successful pre-testing. As a result, the later deployment may fail.

In yet another approach, a policy decision point could be configured to predict a response of a policy enforcement point to downloaded configuration information, if the PEP provided enough information in a COPS request (REQ) message. However, such a predictive approach has inherent limitations. In particular, a PEP could not necessarily commit to a downloaded configuration due to resource constraints, internal conflicts with other features or other types of configuration, or feature capability constraints.

Examples of resource constraints include insufficient memory, filters, buffers, queues, etc. Resource constraints of a PEP are extremely difficult or impossible for a PDP to predict, even if such constraints are somehow communicated to the PDP by the PEP in a request message. Internal configuration conflicts may vary from one PEP to another and change from a single device version to the following, and therefore would be too complex to predict by the PDP or communicate to the PDP in the request message.

If a PEP device communicates any feature capability constraints within the REQ message using PIB definitions, the PDP can predict failures caused by feature capability constraints, thereby avoiding downloading configuration information for which the PEP cannot commit. However, there is always a chance that the PEP will reject a downloaded configuration due to capability constraints, unless the configuration is previously tested by that PEP.

Moreover, COPS defines limited feedback reporting capabilities for PEPs. If a partial configuration is received, the PEP is required to reject it and report rejection to the sending PDP. However, there is no way for the PEP to report to a PDP that one or more constraints of the PEP are preventing or will prevent proper implementation of a configuration by the PEP.

The consequences of these drawbacks can be severe. If a provisioned device configuration is downloaded to less than all intended devices, or if a partial download of a configuration occurs with respect to a single network device, unpredictable results may occur. At best a minor system malfunction may occur, or a major system failure may occur in a worst case. For example, a partial download of a Differentiated Services configuration may result in inconsistent application of QoS per hop behavior over the network. As another example, sending partial virtual private network configuration information to devices that are intended to form a VPN may result in malfunctioning of the virtual private network. As a third example, a deploying a partial security configuration may result in creating one or more server security holes, or denial of services to innocent users ("insults").

Based on the foregoing, there is a clear need for a way to deploy quality of service policy information to a plurality of network devices, or to an entire network, with assurance that all devices will receive all applicable policy information.

There is a specific need for a way to adapt the COPS protocol to operate in transactions with multiple policy enforcement points.

SUMMARY OF THE INVENTION

The foregoing needs, and other needs and objects that will become apparent for the following description, are achieved in the present invention, which comprises, in one aspect, a method for communicating network quality of service policy information to a plurality of policy enforcement points. Active QoS configuration information is created and stored at a policy enforcement point, such as a router in a network. New configuration information is received and stored as an inactive configuration of the policy enforcement point. The policy enforcement point determines whether the inactive configuration information is properly functional in combination with the active QoS configuration information. The new configuration information is made active in place of the active QoS configuration information only in response to receiving an activation message.

According to one feature, receiving new configuration information comprises receiving a COPS protocol decision message from the policy decision point that identifies the configuration information as an inactive configuration by a specified flag bit in a message type value in a Context object that forms part of the decision message.

Using the method, network quality of service policy information may be communicated to a plurality of policy enforcement points, with assurance that all receiving policy enforcement points can successfully deploy the configuration information. The new configuration information is received and stored in an inactive configuration area of memory of the policy enforcement point. The inactive configuration is actively deployed only after it is tested in combination with existing active configuration information, and its operability is validated through various checks and tests. An inactive configuration is signaled by a specified COPS protocol message, and other COPS messages are defined to provide for deploying or activating the inactive configuration. As a result, new QoS policy configuration information can be deployed to an entire network or to a large plurality of devices with assurance that all such information is received and deployed without adverse effects on the network or enforcement of policy information.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for communicating network quality of service policy information to a plurality of policy enforcement points is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figures 1A, 1B:
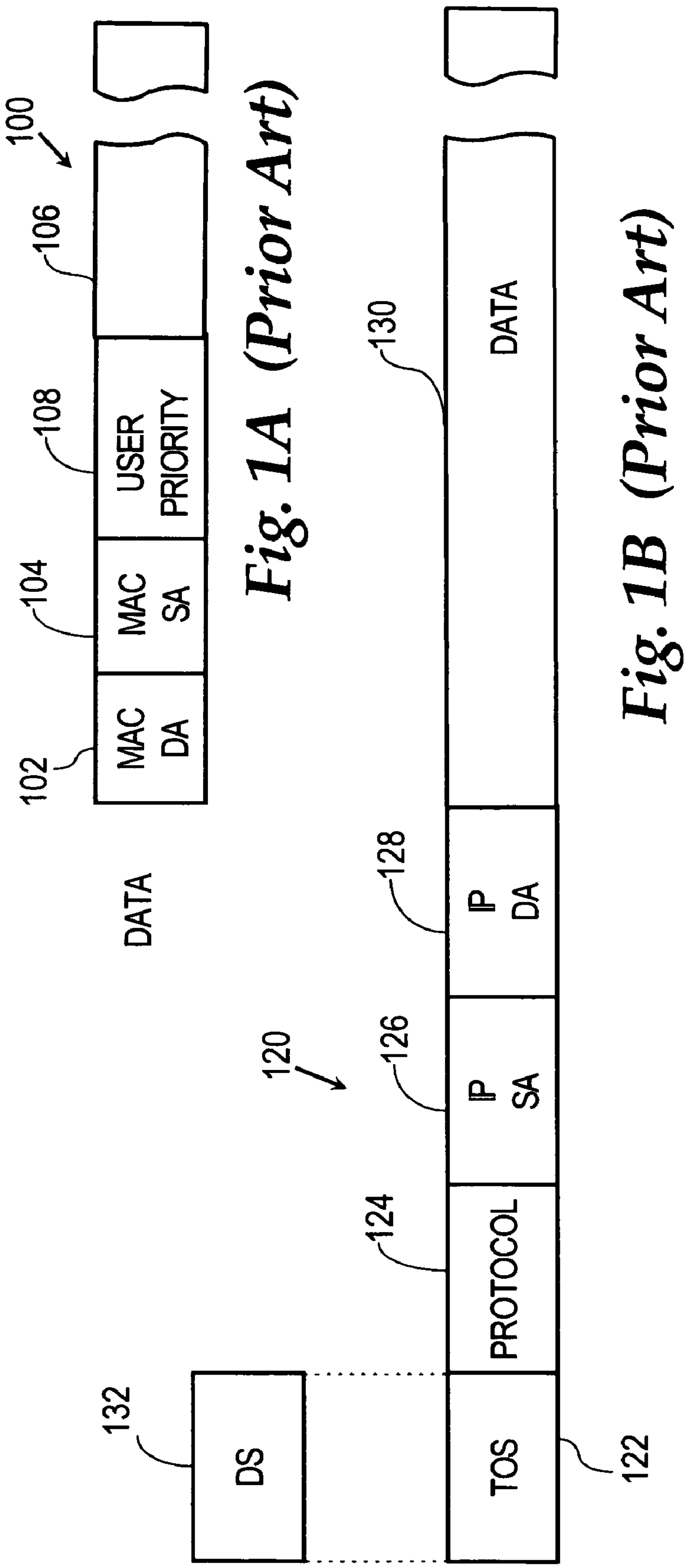
FIG. 1A is a prior art partial block diagram of a network message.
FIG. 1B is a prior art partial block diagram of a network message.
Figure 2:
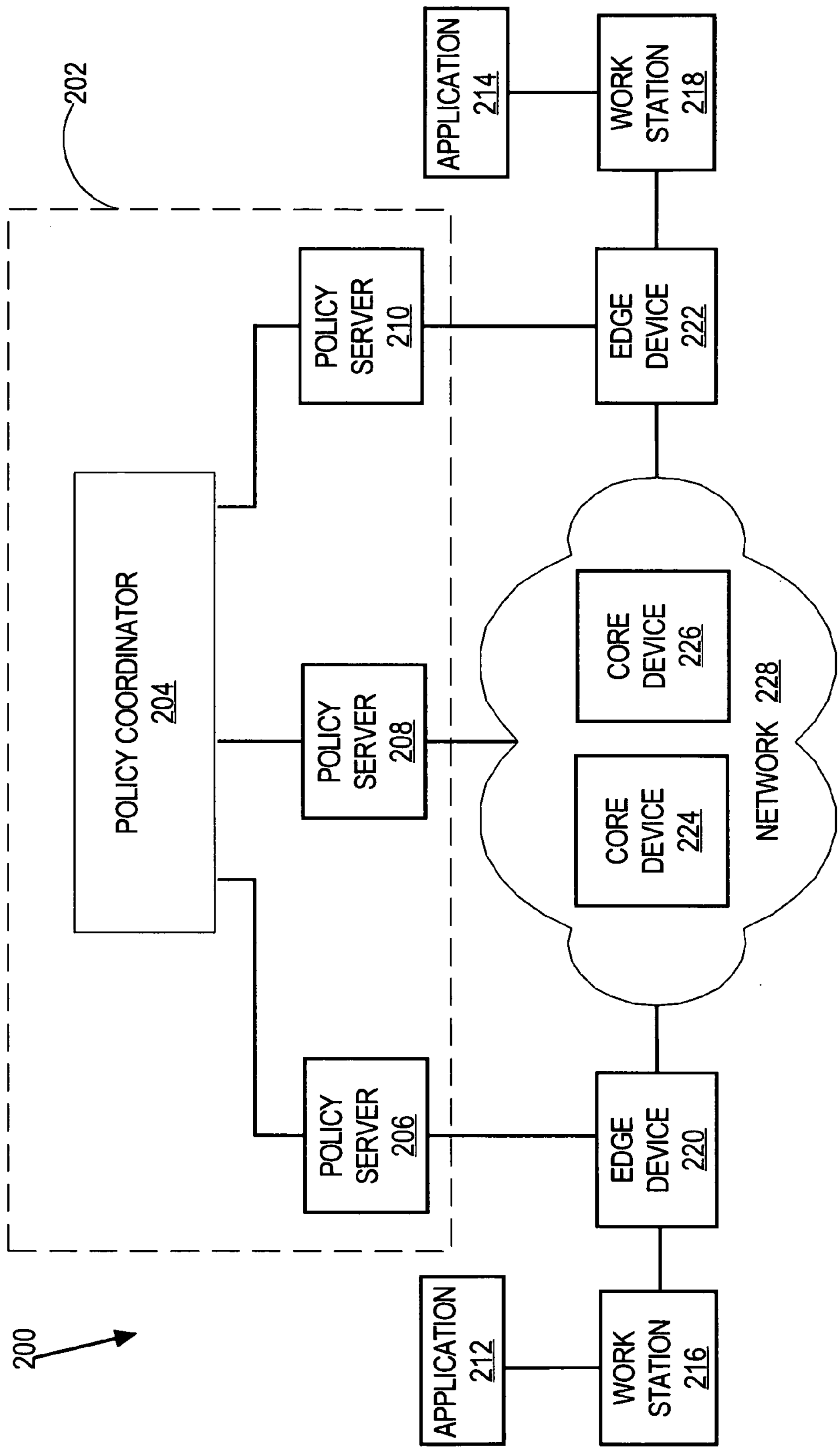
FIG. 2 is a block diagram of a computer network in which in which the present invention may be utilized.

FIG. 2 is a block diagram of a computer network 200 illustrating certain elements of an embodiment. Generally, computer network 200 includes one or more network devices 220, 222, 224, 226 a plurality of workstations 216, 218, a policy management station 202 and a network 228.

Network devices 220, 222 represent edge network devices such as routers, switches, or other similar or equivalent devices that are configured for coloring packets within network 228. In one embodiment, network devices 220, 222 are configured to execute the Cisco Internetworking Operating System (IOS) and are capable of marking packets with DSCP values, i.e., they are compatible with Differentiated Services. Such marking may be carried out using a marker or other software element or application that runs under control of IOS, e.g., an agent or process. Network devices 224, 226 represent internal network devices such as routers, switches, or other similar or equivalent devices that are configured for forwarding packets within network 228 based the color of each packet. In certain embodiments, network devices 224, 226 are configured to execute the Cisco Internetworking Operating System (IOS) and are capable of forwarding packets based on their DSCP values, i.e., they are compatible with Differentiated Services. It should be noted that network devices 220, 222 and network devices 224, 226 may in fact represent similar or even identical device types and/or models that are each configured to perform a designated function within computer network 200.

Workstations 216, 218 may be personal computers, workstations, or other network end stations at which work is done, such as printers, scanners, facsimile machines, etc. In certain embodiments, workstations 216, 218 may themselves be network devices, such as bridges, gateways, routers or switches that allow computer network 200 to connect to another network system. For example, workstation 216 may be an edge device that is configured for coloring packet of a different DS domain. In certain embodiments, workstations 216, 218 execute one or more applications 212, 214. Applications 212, 214 may represent a variety of different computer applications that execute on workstations 216, 218 respectively and which cause data to be sent and received over network 228.

Network 228 is a network system comprising any number of network devices. Network 228 may form part of a LAN or WAN. In one embodiment, network 228 is a packet-switched IP network configured as a DS domain whereby treatment of packets that flow through network 228 is controlled and managed by Policy Management Station 202 and network devices 220, 222, 224, 226.

Policy Management Station 202 is a computer, or a group of hardware or software components or processes that cooperate or execute in one or more computer systems. In this example, Policy Management Station 202 includes a policy coordinator 204 and one or more policy servers 206, 208, 210, which are coupled to network devices 220, 222, 224, 226. In one embodiment, policy coordinator 204 communicates with policy servers 206, 208, 210 to configure the network devices 220, 222, 224, 226, to control the coloring and forwarding of packets within network 228. For example, policy coordinator 204 may direct network devices 220, 222 to color the packets of all Voice Over IP (VOIP) flows as Gold (high priority) and to color the packets of all File Transfer Protocol (FTP) flows as Bronze (low priority). Each color corresponds to a particular service level and is associated with one or more QoS treatment parameters, e.g., a pre-defined DSCP value and possibly other values or characteristics. Policy coordinator 204 may further direct network devices 224, 226 to apply a particular forwarding policy based on the particular color of each packet that is processed.

In one embodiment, Policy Management Station 202 provides a mechanism whereby a network administrator may select or define a desired service level that is to be applied to a particular group of data flows within network 228. For example, an administrator may choose to have a service level of Gold be applied to all VOIP flows within computer network 200. In response, policy coordinator 204 communicates with the policy servers to cause edge devices 220, 222 to set an initial DiffServ Codepoint value in the packets of all VOIP flows. An example of a commercial product suitable for use as Policy Management Station 202 is CiscoAssure QoS Policy Manager 1.0, commercially available from Cisco Systems, Inc.

In certain embodiments, policy coordinator 204 includes a service monitor 230 that consists of one or more hardware or software elements that are configured to collect dropped packet information based on the number of packets that are dropped by network devices 220, 222, 224, 226 within network 228. Based on the dropped packet information, service monitor 230 determines whether a particular service level is receiving the required level of service. If service monitor 230 determines that a particular service level is not receiving the required level of service (e.g., packets belonging to that service level are being dropped), service monitor 230 determines an updated QoS treatment policy for achieving the required service level for the associated group of data flows. Service monitor 230 then communicates the updated QoS treatment policy to markers or other elements of devices 220, 222 to dynamically color the packets of each flow to better meet the specific bandwidth needs of the data flows. Examples of how dropped packet information may be determined is described in detail below.

Although the example embodiment of FIG. 2 shows two (2) workstations 216, 218, three (3) policy servers 216, 208, 210, two (2) edge devices 220, 222, and two (2) core devices 224, 226, in other practical embodiments there may be any number of such elements. In addition, Policy Management Station 202 is provided as only an example of one type configuration that may be used to manage QoS policies. Thus, Policy Management Station 202 may be configured as a single component or instead variety of different distributed components that are configured for implementing adaptive QoS policies to maintain the level of service that is required by the service levels within a network. In addition, although not depicted in FIG. 2, in certain embodiments, policy servers 206 and 210 are coupled to network 228 and thus may communicate with edge devices 220 and 222 over network 228.

Figure 3A:
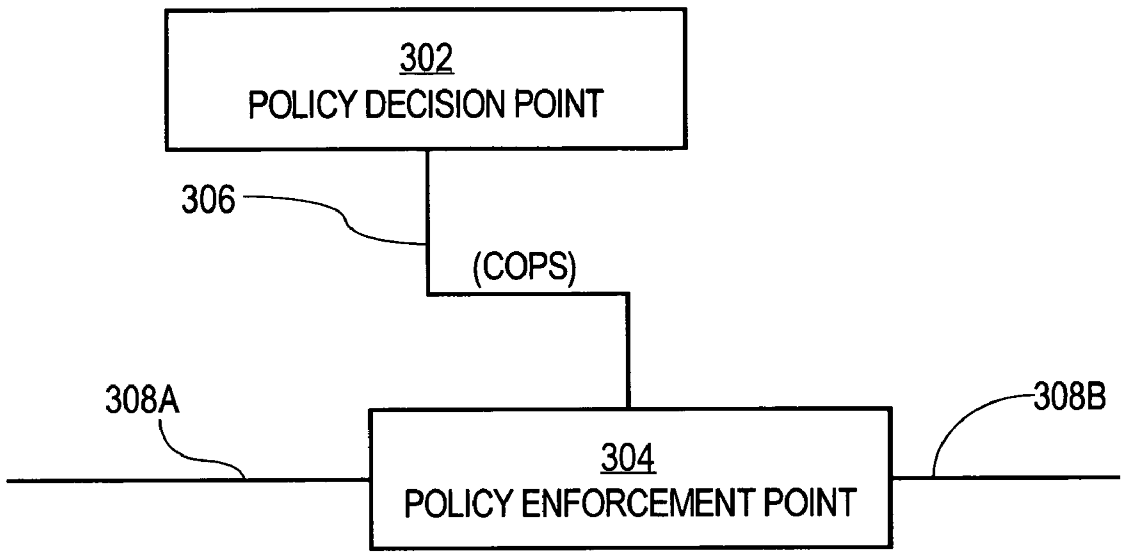
FIG. 3A is a block diagram of a PDP and a PEP illustrating use of COPS.

FIG. 3A is a block diagram of a policy decision point and a policy enforcement point in a network that illustrates use of COPS.

A policy decision point 302 is coupled by link 306, which sends and receives COPS messages, to policy enforcement point 304. One or more transmission paths 308A, 308B are coupled to PEP 304, and typically terminate in a network element of a LAN, WAN, Internet, etc. In this way, policy decision point 302 can execute one or more QoS policy decisions and efficiently communicate the decisions to PEP 304, which enforces the decisions with respect to network traffic traveling through PEP 304 on paths 308A, 308B. An optional Local Policy Decision Point (LPDP) can be used by PEP 304 to make local policy decisions in the absence of a PDP. The PEP may communicate with a policy server (herein referred to as a remote PDP) to obtain policy decisions or directives.

Each PEP initiates a persistent TCP connection to a PDP and uses the TCP connection to send requests to and receive decisions from the remote PDP. One PDP implementation per server listens on a well-known TCP port number, e.g., port 3288. The PEP is responsible for initiating the TCP connection to a PDP.

Communication between the PEP and remote PDP generally comprises a request to which a decision is provided a response, however, the remote PDP may send unsolicited decisions to the PEP to force changes in previously approved request states. The PEP also can report to the remote PDP that it has successfully completed performing a decision of a PDP decision locally, which is useful for accounting and monitoring purposes. The PEP is responsible for notifying the PDP when a request state has changed on the PEP. Further, the PEP is responsible for the deletion of any state that is no longer applicable due to events at the client or decisions issued by the server.

Under COPS, when a PEP sends a configuration request, the PDP continuously sends named units of configuration data to the PEP via decision messages as applicable for the configuration request. When a unit of named configuration data is successfully installed on the PEP, the PEP sends a report message to the PDP confirming the installation. The server may then update or remove the named configuration information via a new decision message. When the PDP sends a decision to remove named configuration data from the PEP, the PEP will delete the specified configuration and send a report message to the PDP as confirmation.

COPS communicates self-identifying objects that contain data necessary for identifying request states, establishing the context for a request, identifying the type of request, referencing previously installed requests, relaying policy decisions, reporting errors, providing message integrity, and transferring client specific/namespace information.

The context of each request corresponds to the type of event that triggered it. A COPS Context object identifies the type of request and message (if applicable) that triggered a policy event via its message type and request type fields. The Context object is defined in detail in RFC 2748, section 2.2.2. COPS identifies three types of outsourcing events: (1) the arrival of an incoming message (2) allocation of local resources, and (3) the forwarding of an outgoing message. Each of these events may require different decisions to be made. The content of a COPS request/decision message depends on the context. A fourth type of request is useful for types of clients that wish to receive configuration information from the PDP. This allows a PEP to issue a configuration request for a specific named device or module that requires configuration information to be installed.

Figure 3B:
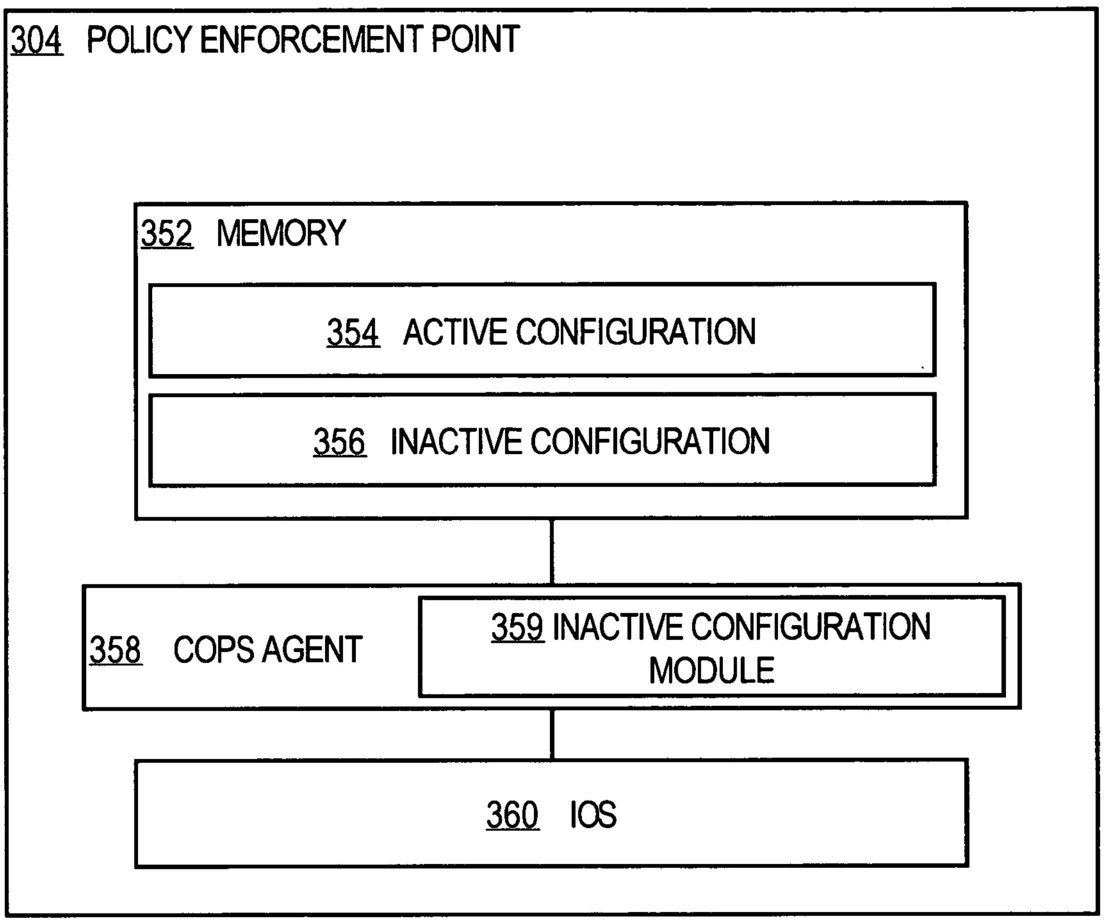
FIG. 3B is a block diagram of a policy enforcement point that can participate in multiple-device policy deployment transactions.

FIG. 3B is a simplified block diagram of a policy enforcement point that can participate in multiple-device policy deployment transactions.

In general, PEP 304 has memory 352, COPS Agent 358, and IOS 360. PEP 304 may have other elements that are useful to carry out policy enforcement functions but that are not essential to the invention. For example, PEP 304 may have one or more network interfaces, processors, switching circuitry, a terminal interface, etc. In one embodiment, PEP 304 is a router that is configured to carry out the functions set forth herein.

Memory 352 comprises an Active Configuration 354 and an Inactive Configuration 356. Active Configuration 354 comprises a plurality of configuration parameter values stored min association with one another, and represents the then-current configuration of PEP 304. The Active Configuration 354 determines the operational behavior of the device. Similarly, Inactive Configuration 356 comprises a plurality of configuration parameter values, but is inactive and does not affect operation of PEP 304 or its participation in QoS policy enforcement. Active Configuration 354 and Inactive Configuration 356 each are formatted as a Policy Information Base (PIB).

IOS 360 is an operating system software element that controls and supervises basic functions of PEP 304. In one embodiment, IOS 360 is the Internetworking Operating System of Cisco Systems, Inc.

COPS Agent 358 is an application software element that enables PEP 304 and IOS 360 to communicate over appropriate interfaces using the COPS protocol. In one embodiment, COPS Agent 358 is one or more software elements that interact with IOS 360 in order to carry out COPS functions including the specific functions described herein. In one embodiment, COPS Agent 358 includes an Inactive Configuration Module 359 that comprises one or more sequences of program instructions for carrying out the specific functions described herein. Thus, the invention disclosed herein may be implemented in one or more software elements that are executed by a network device, for example, by modifying existing COPS processing software of a network device to carry out the functions described herein.

"Install But Not Deploy" Process

According to one embodiment, a process of installing QoS configuration information in a network device without deploying the information is provided. In certain descriptions herein, the process is termed "install but not deploy" or "inactive installation."

Generally, initially, an Inactive Configuration is made equal to an Active Configuration. In an alternative embodiment, storing inactive configuration information involves storing one or more PIB variable values that are marked as inactive. In this embodiment, the Inactive Configuration may comprise a subset of the Active Configuration, whereas the Active Configuration contains at least one value for all defined PIB variables. Upon startup or otherwise at initialization of a PEP, the Active Configuration is the same as the Inactive Configuration, and one or both change only in response to the PEP receiving decision information from a PDP.

Each PEP maintains active and inactive configuration information in a similar way. In one embodiment, a PDP makes a policy decision and sends corresponding policy decision information, with decision context information, to one or more PEP devices. Each PEP device determines, based on the decision context information, which configuration (active or inactive) should receive the policy decision information.

The PEP then performs one or more consistency and applicability checks, and based on the results, determines whether to install the decision information. If the PEP accepts the decision information, then the PEP stores the decision information in either the Active Configuration or the Inactive Configuration, and issues a commit report. If the PEP decides not to install the decision, then the PEP sends a reject message to the originating PDP, and issues a non-commit report.

Figure 4A:
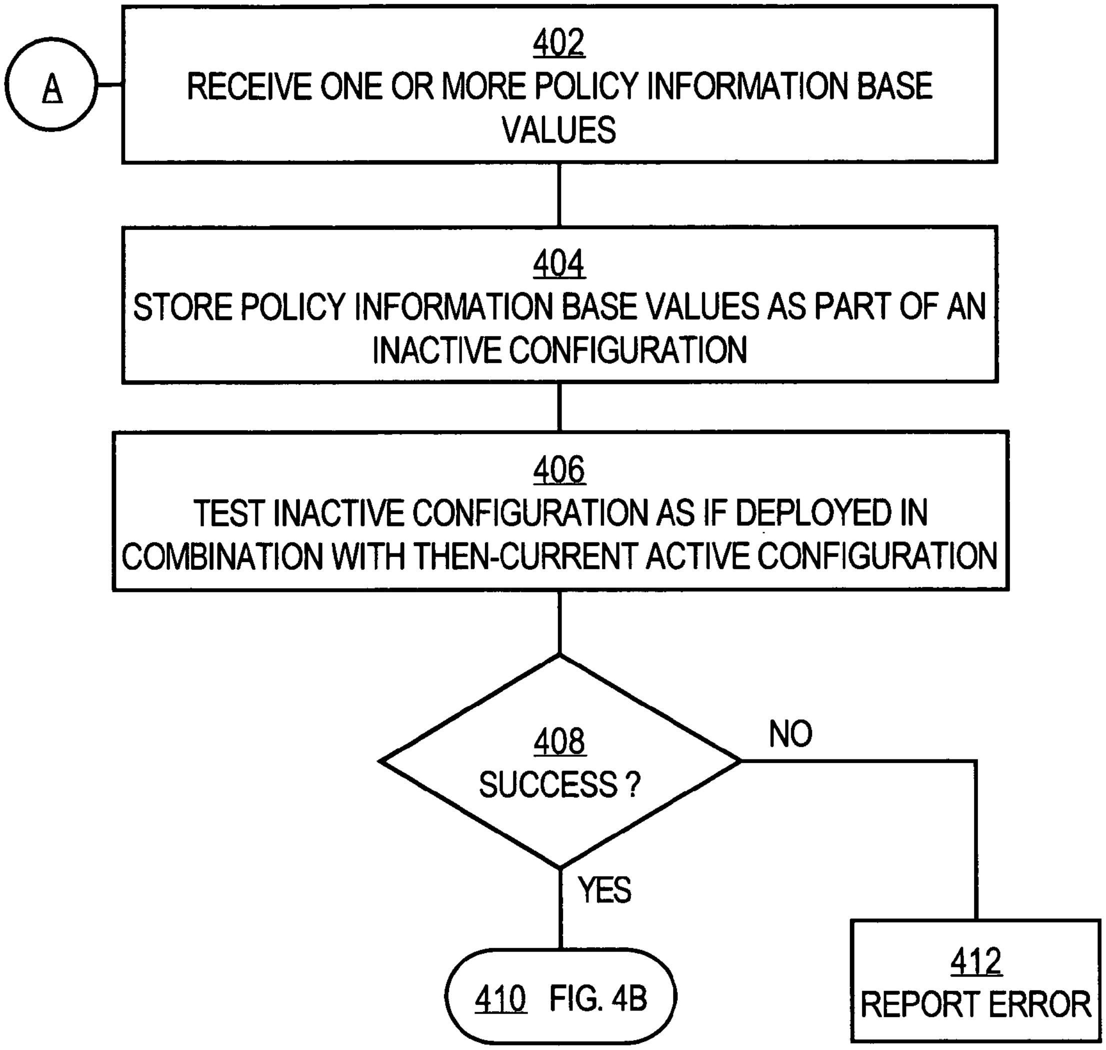
FIG. 4A is a flow diagram of a portion of one process of installing inactive QoS configuration information.
Figure 4B:
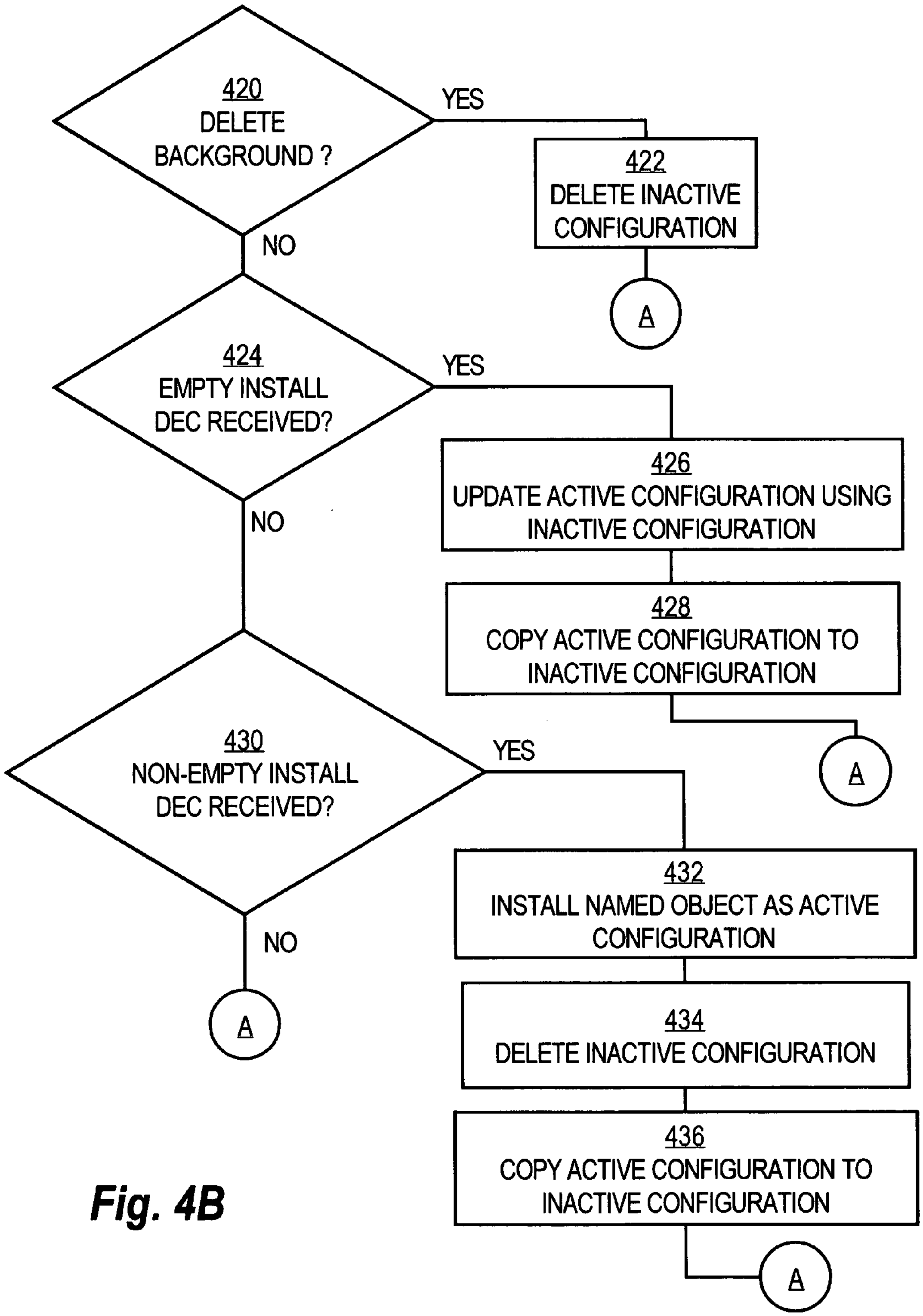
FIG. 4B is a flow diagram of another portion of a process of installing inactive QoS configuration information.
Figure 4C:
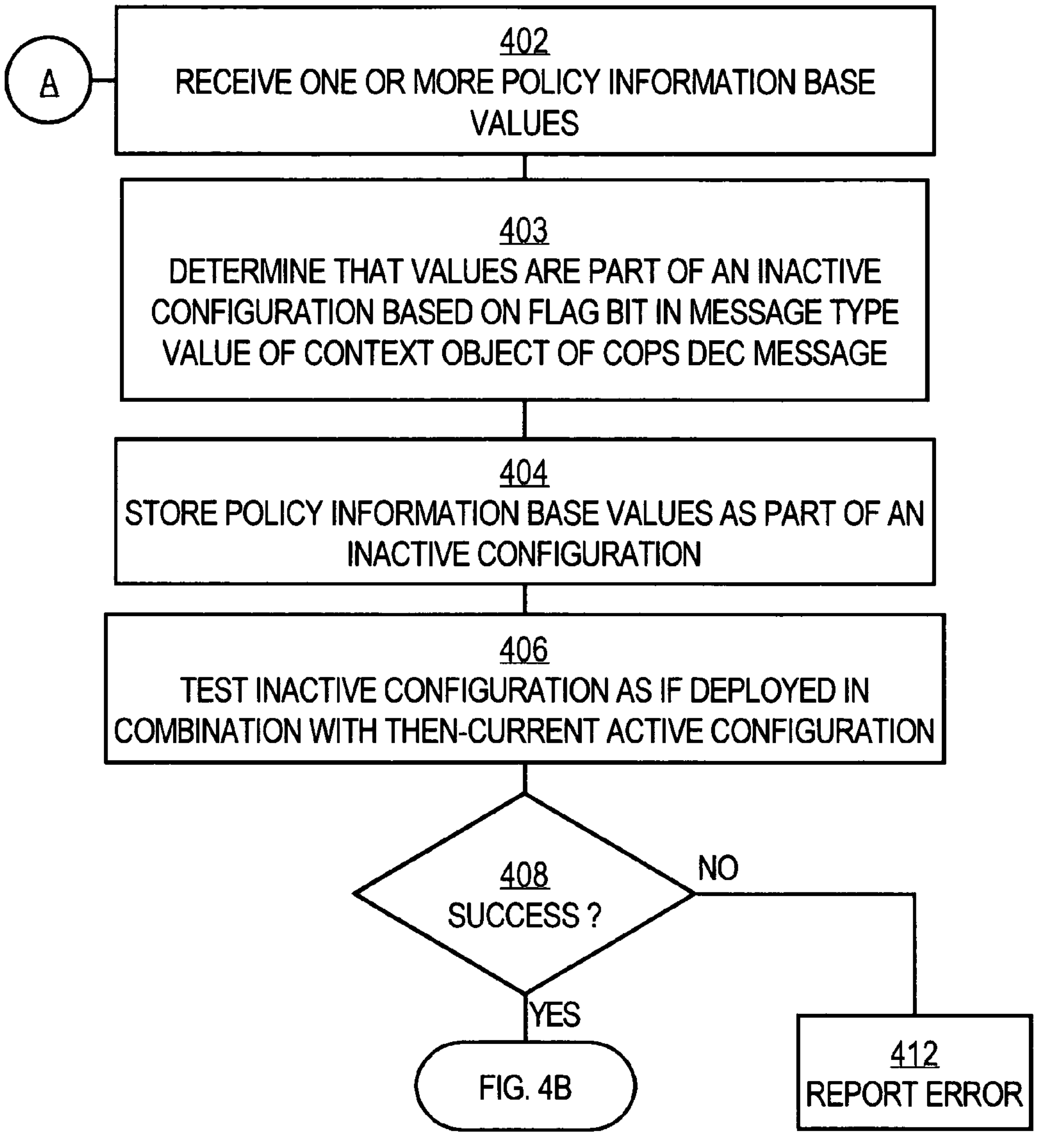
FIG. 4C is a flow diagram of an alternative process of installing inactive QoS configuration information.

FIG. 4A and FIG. 4B are flow diagrams of examples of one inactive installation process, and FIG. 4C is a flow diagram of an alternative inactive installation process. Inactive Configuration Module 359 of COPS Agent 358 may be implemented using one or more sequences of computer program instructions that carry out the processes of FIG. 4A, FIG. 4B, or FIG. 4C.

Referring first to FIG. 4A, a process is provided in which a policy decision point may install or delete one or more policy information base (PIB) items as an inactive configuration at a policy enforcement point. In block 402, one or more policy information base values are received. Block 402 may involve receiving, at a policy enforcement point, a request to install an inactive ("background") configuration, receiving one or more PIB variable values and storing them as part of inactive configuration information, e.g., Inactive Configuration 356 of PEP 304 of FIG. 3B.

In one specific embodiment, installation of an inactive configuration is signaled in a COPS protocol message. The COPS protocol defines an Install Context object that is used for regular install/delete decision ("DEC") messages, as described in RFC 4748, section 4.2.2. The Context object comprises a 4-byte Request Type ("R-type") value and a Message Type ("M-type") value, which is also 16 bits in length. The M-type carries a plurality of client-specific flag values. Thus, installation of an Inactive Configuration may be signaled by a specified M-type value in the Context object. For example, the M-type value "0×01" may signify a request to install an Inactive Configuration. The specified M-Type value, together with an Install Context flag, is sent by a PDP in a DEC message when installing Inactive configuration information. Further, when a PEP responds with a reply ("REP") mes sage, the specified M-Type value is placed in the REP message.

Referring now to FIG. 4C, in one embodiment, as shown by block 403, a policy enforcement point determines that the policy information base values that it received in block 402 are part of an inactive configuration based on a flag bit in the message type value of the Context object of a COPS DEC message.

Referring again to FIG. 4A, in block 404, the policy enforcement point stores the policy information base values as part of an inactive configuration. In one embodiment, the values are stored in Inactive Configuration 356 under control of instructions in Inactive Configuration Module 359.

In block 406, the PEP tests the inactive installation as if it is deployed on top of the active configuration, i.e., in combination with the then-current active configuration. Such testing may involve, for example, carrying out consistency checks, verifying that all needed resources are available, etc., with respect to the resulting modified configuration. Consistency checks may involve checking consistency of the values in the resulting configuration. Thus, the PEP may determine whether the new configuration information will work if deployed, without actively deploying it until such determination is complete.

If such testing is unsuccessful, as indicated by block 408 and block 412, an error is reported to the policy decision point.

Otherwise, control passes to the steps of FIG. 4B. The policy enforcement point retains in memory both its active configuration information and the newly installed, inactive configuration information.

In block 420, the policy enforcement point tests whether a Delete Background (Inactive) COPS message is received. The format of this message is the same as the conventional COPS PR DEC message with the exception that the Flag value in the "Decision Flag" COPS Object includes the new inactive flag. The BNF format of this message is:

<Decision Message>::=<Common Header>
<Client Handle>
[<Decision>]+|<Error>
[<Integrity>]

Where:
<Decision>::=<Context>
<Decision: Command-Code>//i.e. decision flag object which includes the inactive flag.
[<Decision: Named Data>]
and, <Decision: Named Data>::=<<Install Decision>|<Remove Decision>>

If the test of block 420 is true, then the Active Configuration 354 is not changed, however, the PEP deletes all values from the Inactive Configuration 356, as indicated by block 422. In one embodiment, the Inactive Configuration 356 is then automatically updated by copying values from the Active Configuration 354, so that both sets of information are the same.

In block 424, the policy enforcement point tests whether a regular empty install decision (DEC) message has arrived from the PDP. A DEC message is termed "empty" when it does not carry the name of a particular configuration object that contains configuration information. Such a message instructs the policy enforcement point to deploy the inactive configuration information, i.e., make the inactive configuration information active. In response, the PEP updates Active Configuration 354 with information from Inactive Configuration 356, as indicated by block 426, and begins using it for enforcement of quality of service. Such updating involves introducing one or more new configuration parameters into Active Configuration 356 and may also involve updating existing parameters of the Active Configuration based on the Inactive Configuration. In other words, block 426 does not imply merely copying the Inactive Configuration to the Active Configuration.

Because such updating may involve modifying the Active Configuration, in one embodiment, PEP also sets Inactive Configuration 356 equal to Active Configuration 354, as indicated by block 428 after carrying out the update. This ensures that after the update, the Inactive Configuration 356 is identical to the Active Configuration 354 until new inactive configuration information is received. Making Inactive Configuration 356 equal to Active Configuration 354 may involve first deleting all values from the Inactive Configuration.

In block 430, the policy enforcement point tests whether a non-empty install DEC message has arrived. Such a message carries the name of a configuration object that contains configuration information, and instructs the PEP to activate the named configuration 4 information and disregard any previous inactive installation information.

In response, in block 432 the PEP installs the named object as the active configuration. Further, in block 434 the PEP removes the inactive information from memory, and resets the inactive configuration to be equal to the named configuration information, as indicated by block 436. Thus, a non-empty install decision message will install a named configuration and also eliminate an inactive configuration that was associated with the prior active configuration that has been replaced by the named configuration.

The steps of block 428 and block 436 also may involve issuing one or more responsive messages from the PEP to the PDP. For example, the PEP can issue a commit report to the PDP that indicates that the PEP successfully committed the inactive configuration. In this context, to "commit" means to deploy or make active for use in pol icy enforcement by the PEP.

Accordingly, a simple and effective method for communicating network quality of service policy information to a plurality of policy enforcement points, with assurance that all receiving policy enforcement points can successfully deploy the configuration information, has been described. Using the approach described herein, new configuration information is actively deployed only after it is tested in combination with existing configuration information, and operability is validated through various checks and tests. As a result, new QoS policy configuration information can be deployed to an entire network or to a large plurality of devices with assurance that all such information is received and deployed without adverse effects on the network or enforcement of policy information.

In this embodiment, the PEP may accept a plurality of "inactive" installations that build a complete inactive configuration in incremental steps. Support for inactive installation may be optional, such that a PEP that does not recognize inactive installation may reject the inactive install DEC message.

It will be apparent that each PDP decision that is sent to a PEP is identified as relating to either the Active Configuration or Inactive Configuration. Preferably, the PDP never sends messages in which the applicable configuration is ambiguous or undefined. Also preferably, the first decision that the PDP sends after receiving a new request is an active configuration decision.

According to the rules of operation described herein, any decision about the Active Configuration results in a reset of the Inactive Configuration. In one specific embodiment, each PDP resets its Inactive Configuration, without changing its Active Configuration information, in response to receiving a null active configuration decision. Thus, the null active configuration decision provides a mechanism for resetting the Inactive Configuration without requiring a change to the Active Configuration.

The foregoing process is compatible with all PEPs, including those that do not include software elements or other means to respond to the messages defined herein. In particular, assume that a PEP does not support use of Inactive Configuration information, but receives a DEC message with the specified M-Type flag value in the Context object. In response, the device will return an Error object indicating that the device does not support the requested action. In one embodiment, a new General Error value is defined to indicate "Active configuration support only." Definition of such a new error value enables a PDP or other application to determine exactly why a PEP has rejected a DEC message containing the specified M-type flag value in the Context object.

Hardware Overview

Figure 5:
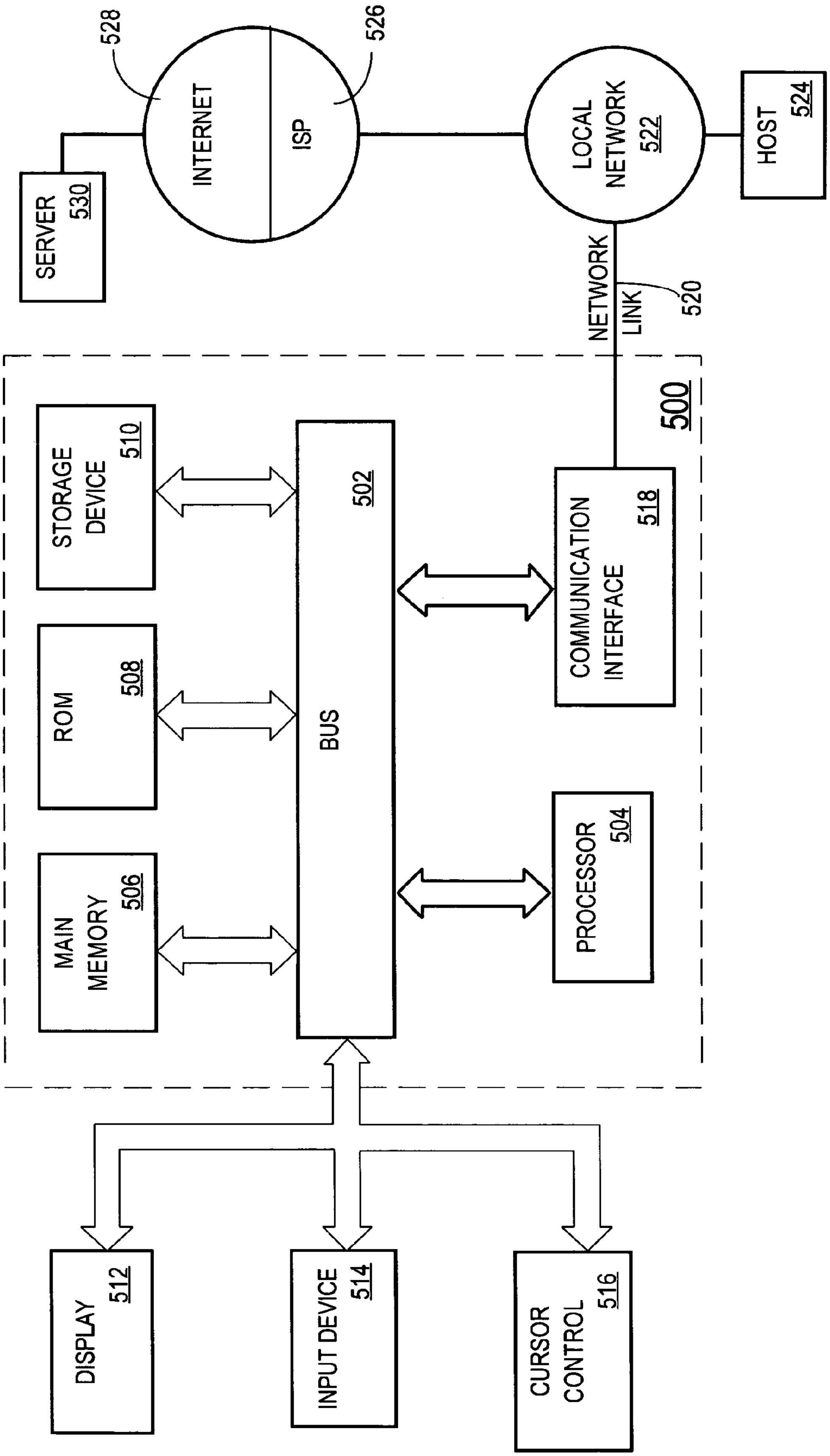
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for communicating network quality of service policy information to a plurality of policy enforcement points. According to one embodiment of the invention, communicating network quality of service policy information to a plurality of policy enforcement points is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection 4 through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for communicating network quality of service policy information to a plurality of policy enforcement points.

The received code may be executed by processor 504 as it is received, and/or stored in storage device 510, or other non-volatile storage for later execution. In this manner, computer system 500 may obtain application code in the form of a carrier wave.

Alternatives And Variations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of enforcing network quality of service policy information at one or more policy enforcement points, the method comprising the computer-implemented steps of:

receiving active QoS configuration information at a policy enforcement point;

receiving new configuration information and storing the new configuration information as an inactive configuration of the policy enforcement point;

storing the active QoS configuration information and the inactive configuration in logically separate areas of memory of a network device that serves as the policy enforcement point;

determining whether the inactive configuration information is properly functional in combination with the active QoS configuration information;

making the new configuration information active in place of the active QoS configuration information only in response to receiving an activation message;

wherein the step of receiving new configuration information further comprises the steps of receiving a decision message from a policy decision point that identifies the configuration information as an inactive configuration by a specified flag bit in a message type value in a Context object that forms part of the decision message.

2. A method as recited in claim 1, wherein the step of receiving new configuration information further comprises the steps of receiving the decision message from the policy decision point and determining whether the decision message identifies an inactive configuration.

3. A method as recited in claim 1, wherein the step of receiving new configuration information further comprises the steps of receiving a COPS decision message from the policy decision point that identifies the configuration information as an inactive configuration by a specified message type value in a Context object that forms part of the decision message.

4. A method as recited in claim 3, wherein determining whether the inactive configuration information is properly functional comprises the steps of combining the inactive configuration information with the active QoS configuration to result in creating a combined configuration and carrying out one or more consistency checks using the combined configuration without actually deploying the combined configuration to the policy enforcement point.

5. A method as recited in claim 1, wherein making the new configuration information active in place of the active QoS configuration information only in response to receiving an activation message comprises the steps of:

receiving an empty install decision message from the policy decision point;

updating the active QoS configuration information using the inactive configuration and thereby deploying the inactive configuration as a new active configuration;

copying the active configuration to the inactive configuration.

6. A method as recited in claim 1, wherein making the new configuration information active in place of the active QoS configuration information only in response to receiving an activation message comprises the steps of:

receiving an install named object decision message from the policy decision point;

installing the object named in the decision message as the active QoS configuration information;

deleting the inactive configuration;

copying the active configuration to the inactive configuration.

7. A method of enforcing network quality of service policy information from a policy server acting as a policy decision point at one or more routers that are acting as policy enforcement points, the method comprising the computer-implemented steps of:

receiving active QoS configuration information;

receiving a COPS protocol decision message from the policy decision point that identifies new configuration information as an inactive configuration by a specified flag bit in a message type value in a Context object that forms part of the decision message;

storing the new configuration information as an inactive configuration of the policy enforcement point;

determining whether the inactive configuration information is properly functional in combination with the active QoS configuration information;

making the new configuration information active in place of the active QoS configuration information only in response to receiving an activation message.

8. An apparatus for enforcing network quality of service policy information at one of a plurality of policy enforcement points, comprising:

means for creating and storing active QoS configuration information at one of the plurality of policy enforcement points;

means for receiving new configuration information and storing the new configuration information as an inactive configuration of the policy enforcement point, wherein the active QoS configuration information and the inactive configuration are stored in logically separate areas of memory of a network device that serves as the policy enforcement point;

wherein the means for receiving new configuration information is for receiving a decision message from a policy decision point that identifies the configuration information as an inactive configuration by a specified flag bit in a message type value in a Context object that forms part of the decision message;

means for determining whether the inactive configuration information is properly functional in combination with the active QoS configuration information;

means for making the new configuration information active in place of the active QoS configuration information only in response to receiving an activation message.

9. An apparatus for enforcing network quality of service policy information at one of a plurality of policy enforcement points, comprising: one or more network interfaces;

one or more processors coupled to the one or more network interfaces for receiving network information therefrom and enforcing one or more network quality of service policies thereon;

one or more stored sequences of instructions accessible to the one or more processors and which, when executed by the one or more processors, cause the one or more processors to carry out the steps of:

creating and storing active QoS configuration information at one of the plurality of policy enforcement points;

receiving new configuration information and storing the new configuration information as an inactive configuration of the policy enforcement point;

wherein the step of receiving new configuration information further comprises the steps of receiving a decision message from a policy decision point that identifies the configuration information as an inactive configuration by a specified flag bit in a message type value in a Context object that forms part of the decision message;

storing the active QoS configuration information and the inactive configuration in logically separate areas of memory of a network device that serves as the policy enforcement point;

determining whether the inactive configuration information is properly functional in combination with the active QoS configuration information;

making the new configuration information active in place of the active QoS configuration information only in response to receiving an activation message.

10. A router acting as a policy enforcement point for enforcing one or more network quality of service policies received from a policy server acting as a policy decision point for a network that includes the router and one or more other policy enforcement points, the router comprising:

one or more network interfaces;

one or more processors coupled to the one or more network interfaces for receiving network information therefrom and enforcing one or more network quality of service policies thereon;

one or more stored sequences of instructions accessible to the one or more processors and which, when executed by the one or more processors, cause the one or more processors to carry out the steps of:

receiving active QoS configuration information;

receiving a COPS protocol decision message from the policy decision point that identifies new configuration information as an inactive configuration by a specified flag bit in a message type value in a Context object that forms part of the decision message;

storing the new configuration information as an inactive configuration of the policy enforcement point;

determining whether the inactive configuration information is properly functional in combination with the active QoS configuration information;

making the new configuration information active in place of the active QoS configuration information only in response to receiving an activation message.

11. A computer-readable medium carrying one or more sequences of instructions for enforcing network quality of service policy information at one or more policy enforcement points, which instructions, when executed by one or more processors, cause the one or more processors to carry out the steps of:

receiving active QoS configuration information at a policy enforcement point;

receiving new configuration information and storing the new configuration information as an inactive configuration of the policy enforcement point;

storing the active QoS configuration information and the inactive configuration in logically separate areas of memory of a network device that serves as the policy enforcement point;

determining whether the inactive configuration information is properly functional in combination with the active QoS configuration information;

making the new configuration information active in place of the active QoS configuration information only in response to receiving an activation message;

wherein the step of receiving new configuration information further comprises the steps of receiving a decision message from a policy decision point that identifies the configuration information as an inactive configuration by a specified flag bit in a message type value in a Context object that forms part of the decision message.

12. A computer-readable medium as recited in claim 11, wherein the step of receiving new configuration information further comprises the steps of receiving a COPS decision message from the policy decision point and determining whether the decision message identifies an inactive configuration.

13. A computer-readable medium as recited in claim 11, wherein the step of receiving new configuration information further comprises the steps of receiving a decision message from the policy decision point that identifies the configuration information as an inactive configuration by a specified message type value in a Context object that forms part of the decision message.

14. A computer-readable medium as recited in claim 13, wherein determining whether the inactive configuration information is properly functional comprises the steps of combining the inactive configuration information with the active QoS configuration to result in creating a combined configuration and carrying out one or more consistency checks using the combined configuration without actually deploying the combined configuration to the policy enforcement point.

15. A computer-readable medium as recited in claim 11, wherein making the new configuration information active in place of the active QoS configuration information only in response to receiving an activation message comprises the steps of:

receiving an empty install decision message from the policy decision point;

updating the active QoS configuration information using the inactive configuration and thereby deploying the inactive configuration as a new active configuration;

copying the active configuration to the inactive configuration.

16. A computer-readable medium as recited in claim 11, wherein making the new configuration information active in place of the active QoS configuration information only in response to receiving an activation message comprises the steps of:

receiving an install named object decision message from the policy decision point;

installing the object named in the decision message as the active QoS configuration information;

deleting the inactive configuration;

copying the active configuration to the inactive configuration.

17. A method of enforcing network quality of service policy information at a plurality of policy enforcement points, the method comprising at each of the plurality of policy enforcement points performing the computer-implemented steps of:

receiving active QoS configuration information at a policy enforcement point;

receiving new configuration information and storing the new configuration information as an inactive configuration of the policy enforcement point;

wherein the step of receiving new configuration information further comprises the steps of receiving a decision message from a policy decision point that identifies the configuration information as an inactive configuration by a specified flag bit in a message type value in a Context object that forms part of the decision message;

storing the active QoS configuration information and the inactive configuration in logically separate areas of memory of a network device that serves as the policy enforcement point;

determining whether the inactive configuration information is properly functional in combination with the active QoS configuration information;

making the new configuration information active in place of the active QoS configuration information only in response to receiving an activation message.

18. A computer-readable medium carrying one or more sequences of instructions for enforcing network quality of service policy information at a plurality of policy enforcement points, which instructions, when executed by one or more processors, cause the one or more processors to carry out, at each of the plurality of policy enforcement points, the steps of:

receiving active QoS configuration information at a policy enforcement point;

receiving new configuration information and storing the new configuration information as an inactive configuration of the policy enforcement point;

wherein the step of receiving new configuration information further comprises the steps of receiving a decision message from a policy decision point that identifies the configuration information as an inactive configuration by a specified flag bit in a message type value in a Context object that forms part of the decision message;

storing the active QoS configuration information and the inactive configuration in logically separate areas of memory of a network device that serves as the policy enforcement point;

determining whether the inactive configuration information is properly functional in combination with the active QoS configuration information;

making the new configuration information active in place of the active QoS configuration information only in response to receiving an activation message.

* * * * *